US012806090B2

(12) United States Patent
Tumavich, Jr. et al.

(10) Patent No.: US 12,806,090 B2
(45) Date of Patent: Nov. 24, 2026

(54) PATIENT TRANSPORT APPARATUS WITH HANDLE ASSEMBLY

(71) Applicant: Stryker Corporation, Kalamazoo, MI (US)

(72) Inventors: James Robert Tumavich, Jr., Kalamazoo, MI (US); Brian J. Tessmer, Mattawan, MI (US); Kevin Cochran, Grand Rapids, MI (US)

(73) Assignee: Stryker Corporation, Portage, MI (US)

( * ) Notice: Subject to any disclaimer, the term of this patent is extended or adjusted under 35 U.S.C. 154(b) by 174 days.

(21) Appl. No.: 18/568,871

(22) PCT Filed: Jun. 29, 2022

(86) PCT No.: PCT/US2022/035478
§ 371 (c)(1),
(2) Date: Dec. 11, 2023

(87) PCT Pub. No.: WO2023/129212
PCT Pub. Date: Jul. 6, 2023

(65) Prior Publication Data

US 2024/0342023 A1 Oct. 17, 2024

Related U.S. Application Data

(60) Provisional application No. 63/293,903, filed on Dec. 27, 2021.

(51) Int. Cl.
*A61G 5/06* (2006.01)
*A61G 5/10* (2006.01)

(52) U.S. Cl.
CPC ............ *A61G 5/061* (2013.01); *A61G 5/066* (2013.01); *A61G 5/10* (2013.01)

(58) Field of Classification Search
CPC ........ A61G 5/061; A61G 1/017; A61G 5/066; A61G 5/10; A61G 1/013; A61G 7/1019;
(Continued)

(56) References Cited

U.S. PATENT DOCUMENTS 5,175,873 A * 12/1992 Goldenberg ........... H04B 1/086
361/679.08
6,648,343 B2 11/2003 Way et al.
(Continued)

OTHER PUBLICATIONS

International Search Report for Application No. PCT/US2022/035478 dated Oct. 14, 2022, 2 pages.

*Primary Examiner* — Vivek D Koppikar
*Assistant Examiner* — Scott Lawrence Strickler
(74) *Attorney, Agent, or Firm* — Howard & Howard Attorneys PLLC

(57) ABSTRACT

A patient transport apparatus operable by a user for transporting a patient along stairs, the patient transport apparatus including a support structure, a seat section, a track assembly, and a front handle assembly. The front handle assembling including an extension defining an inner chamber, a pivot bar, a selector with a button, and a grip shell. The grip shell defines a window shaped to receive the button of the selector and to prevent ingress of contaminants into the inner chamber of the extension, the grip shell being operatively coupled to the extension to retain the selector and the pivot bar relative to the extension.

20 Claims, 14 Drawing Sheets

(58) Field of Classification Search
CPC .. A61G 1/048; A61G 2200/34; A61G 3/0272; A61G 7/1073; A61G 7/1092; A61G 1/003; A61G 5/104; A61G 5/1075
See application file for complete search history.

(56) References Cited

U.S. PATENT DOCUMENTS

| | | | | |
|---|---|---|---|---|
| 2003/0132585 | A1 | 7/2003 | Way et al. | |
| 2009/0230638 | A1 * | 9/2009 | Reed .................... | A61G 5/0891 297/344.22 |
| 2021/0196535 | A1 | 7/2021 | Brosnan et al. | |

* cited by examiner

PATIENT TRANSPORT APPARATUS WITH HANDLE ASSEMBLY

CROSS-REFERENCE TO RELATED APPLICATIONS

The subject patent application claims priority to, and all the benefits of, U.S. Provisional Patent Application No. 63/293,903, filed on Dec. 27, 2021, the entire contents of which are incorporated by reference herein.

BACKGROUND

In many instances, patients with limited mobility may have difficulty traversing stairs without assistance. In certain emergency situations, traversing stairs may be the only viable option for exiting a building. In order for a caregiver to transport a patient along stairs in a safe and controlled manner, a stair chair (or "evacuation chair") may be utilized. Stair chairs are adapted to transport seated patients either up or down stairs, with two caregivers typically supporting, stabilizing, or otherwise carrying the stair chair with the patient supported thereon.

In order to support the stair chair, the caregivers typically grasp one or more handles coupled to the stair chair. The handles may fold or extend to different positions for engagement by the caregiver. However, conventional handles can be difficult to engage under certain conditions. Furthermore, articulation or movement of these types of handles can be difficult to achieve while, at the same time, ensuring that the components of the stair chair remain readily accessible for cleaning, handling, and the like.

A patient transport apparatus designed to overcome one or more of the aforementioned challenges is desired.

SUMMARY

The present disclosure provides patient transport apparatus operable by a user for transporting a patient along stairs. The patient transport apparatus includes: a support structure including an intermediate arm defining a catch; a seat section for supporting the patient, the seat section being pivotably coupled to the support structure about a rear seat axis; a track assembly arranged for movement relative to the support structure between a chair configuration for traversing floor surfaces and a stair configuration for traversing stairs, the track assembly coupled to the support structure for movement between a stowed position and a deployed position for engaging stairs; and a front handle assembly supported within the intermediate arm for movement between: a collapsed position, and an extended position for assisting the track assembly in transporting patients along stairs, the front handle assembly including: an extension defining an inner chamber and having a first end and a second end, the first end disposed in sliding engagement with the intermediate arm of the support structure; a pivot bar pivotably supported within the inner chamber of the extension to the front handle about a pivot axis, the pivot bar extending between a latch end shaped for releasable engagement with the catch of the intermediate arm, and an engagement end; a selector defining a brace body, a button movably supported by the brace body, and an interface arranged to contact the engagement end of the pivot bar in response to user engagement with the button such that pivoting movement of the pivot bar disengages the latch end from the catch; and a grip shell disposed over the second end of the extension and defining a window shaped to receive the button of the selector and to prevent ingress of contaminants into the inner chamber of the extension, the grip shell being operatively coupled to the extension to retain the selector and the pivot bar relative to the extension.

The present disclosure also provides a patient transport apparatus operable by a user for transporting a patient along stairs, where the patient transport apparatus includes: a support structure including a pair of intermediate arms defining respective catches; a seat section for supporting the patient, the seat section being pivotably coupled to the support structure about a rear seat axis; a track assembly arranged for movement relative to the support structure between a chair configuration for traversing floor surfaces and a stair configuration for traversing stairs, the track assembly coupled to the support structure for movement between a stowed position and a deployed position for engaging stairs; and a pair of front handle assemblies each supported within a respective one of the intermediate arms for independent movement between: a collapsed position, and an extended position for assisting the track assembly in transporting patients along stairs, each front handle assembly including: an extension defining an inner chamber and having a first end and a second end, the first end disposed in sliding engagement with the respective intermediate arm of the support structure; a pivot bar pivotably supported within the inner chamber of the extension to the front handle about a pivot axis, the pivot bar extending between a latch end shaped for releasable engagement with the catch of the respective intermediate arm, and an engagement end; a selector defining a brace body, a button movably supported by the brace body, and an interface arranged to contact the engagement end of the pivot bar in response to user engagement with the button such that pivoting movement of the pivot bar disengages the latch end from the catch; and a grip shell disposed over the second end of the extension and defining a window shaped to receive the button of the selector and to prevent ingress of contaminants into the inner chamber of the extension, the grip shell being operatively coupled to the extension to retain the selector and the pivot bar relative to the extension.

BRIEF DESCRIPTION OF THE DRAWINGS

Other advantages of the present invention will be readily appreciated as the same becomes better understood by reference to the following detailed description when considered in connection with the accompanying drawings.

DETAILED DESCRIPTION

Figure 1A:
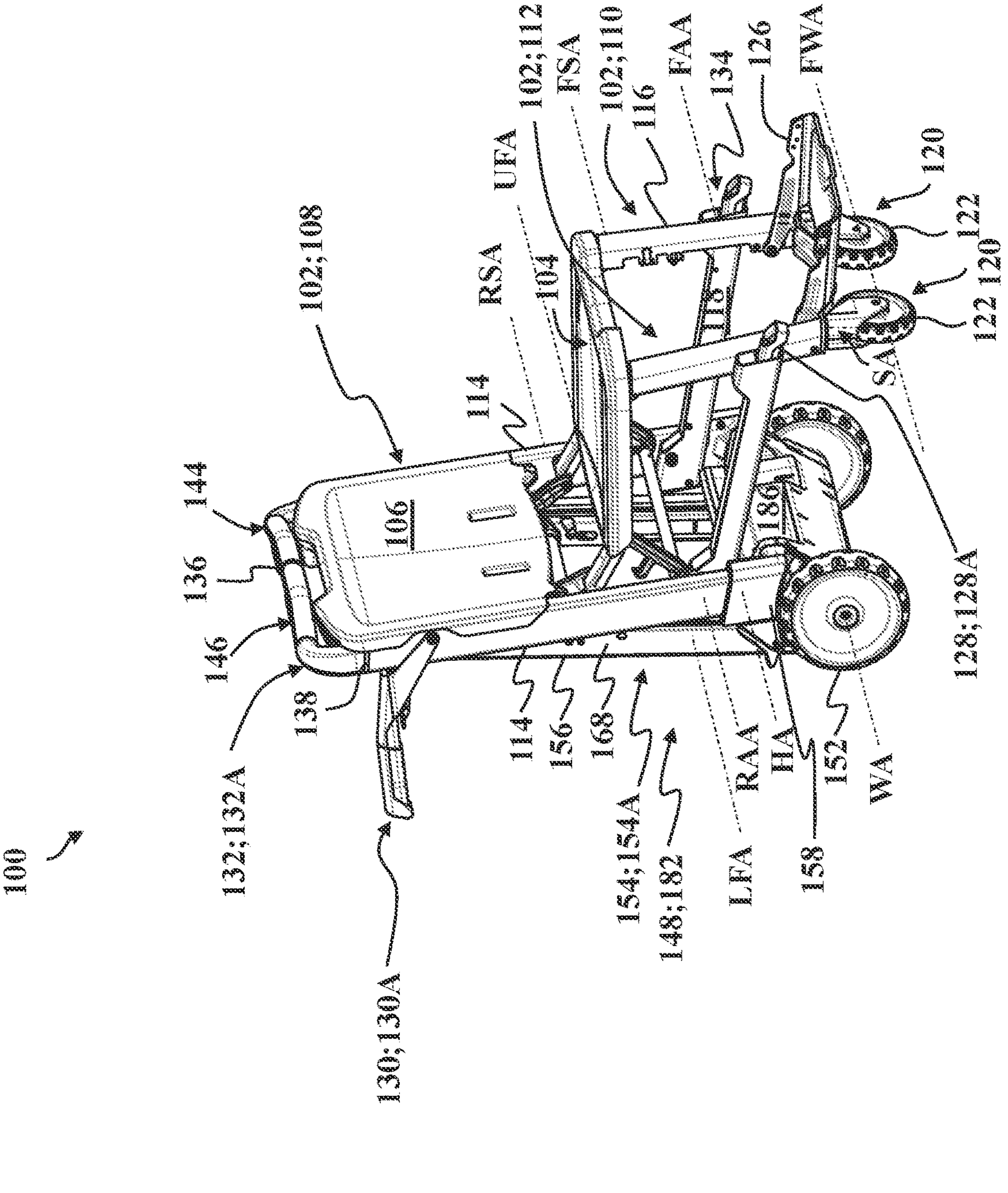
FIG. 1A is a front perspective view of a patient transport apparatus according to the present disclosure, shown arranged in a chair configuration for supporting a patient for transport along a floor surface, and shown having a track assembly disposed in a retracted position, and a handle assembly disposed in a collapsed position.

Referring now to the drawings, wherein like numerals indicate like parts throughout the several views, the present disclosure is generally directed toward a patient transport apparatus 100 configured to allow one or more caregivers to transport a patient. In some versions, the patient transport apparatus 100 may be similar to as is disclosed in U.S. Patent Application Publication No. 2021/0196535, entitled "Patient Containment Systems For Use With Patient Transport Apparatuses," the disclosure of which is hereby incorporated by reference in its entirety.

The patient transport apparatus 100 illustrated throughout the drawings is realized as a "stair chair" which can be operated in a chair configuration to transport the patient across ground or floor surfaces (e.g., pavement, hallways, and the like) and/or during ingress into or egress out of a structure (e.g., a home or building) as shown in FIG. 1, as well as in a stair configuration and/or a stowed configuration (not shown in detail herein) as disclosed in U.S. Patent Application Publication No. 2021/0196535, previously referenced. As is best shown in FIG. 1, the patient transport apparatus 100 comprises a support structure 102 to which a seat section 104 and a back section 106 are operatively attached. The seat section 104 and the back section 106 are each shaped and arranged to provide support to the patient during transport. The support structure 102 generally includes a rear support assembly 108, a front support assembly 110, and an intermediate support assembly 112. The back section 106 is coupled to the rear support assembly 108 for concurrent movement. To this end, the rear support assembly 108 comprises rear uprights 114 which extend generally vertically and are secured to the back section 106, such as with fasteners (not shown in detail). The rear uprights 114 are spaced generally laterally from each other in the illustrated versions and are formed from separate components which cooperate to generally define the rear support assembly 108. However, those having ordinary skill in the art will appreciate that other configurations are contemplated, and the rear support assembly 108 could comprise or otherwise be defined by any suitable number of components. The front support assembly 110 comprises front struts 116 which, like the rear uprights 114, are spaced laterally from each other and extend generally vertically. The intermediate support assembly 112 comprises intermediate arms 118 which are also spaced laterally from each other. Here, too, it will be appreciated that other configurations are contemplated, and the front support assembly 110 and/or the intermediate support assembly 112 could comprise or otherwise be defined by any suitable number of components.

The intermediate support assembly 112 and the seat section 104 are each pivotably coupled to the rear support assembly 108. More specifically, the seat section 104 is arranged so as to pivot about a rear seat axis RSA which extends through the rear uprights 114, and the intermediate arms 118 of the intermediate support assembly 112 are arranged so as to pivot about a rear arm axis RAA which is spaced from the rear seat axis RSA and also extends through the rear uprights 114. Furthermore, the intermediate support assembly 112 and the seat section 104 are also each pivotably coupled to the front support assembly 110. The seat section 104 pivots about a front seat axis FSA which extends through the front struts 116 and the intermediate arms 118 pivot about a front arm axis FAA which is spaced from the front seat axis FSA and extends through the front struts 116. The intermediate support assembly 112 is disposed generally vertically below the seat section 104 such that the rear support assembly 108, the front support assembly 110, the intermediate support assembly 112, and the seat section 104 generally define a four-bar linkage which helps facilitate movement between the stowed configuration and the chair configuration. Other configurations are contemplated.

Figure 1B:
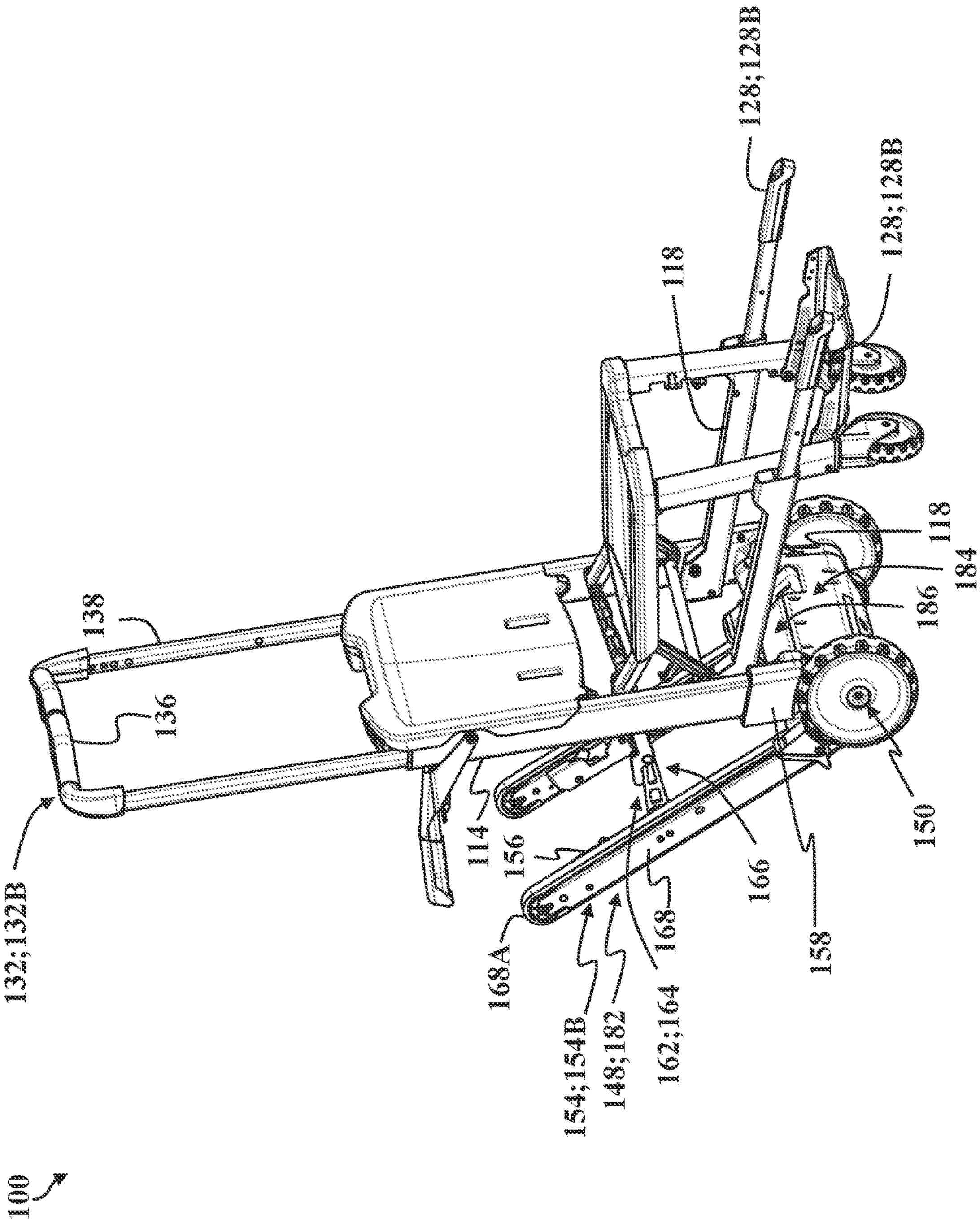
FIG. 1B is another front perspective view of the patient transport apparatus of FIG. 1A, shown arranged in a stair configuration for supporting the patient for transport along stairs, and shown with the track assembly disposed in a deployed position, and with the handle assembly disposed in an extended position.

Referring now to FIGS. 1A and 1B, the front support assembly 110 includes a pair of caster assemblies 120 which each comprise a front wheel 122 arranged to rotate about a respective front wheel axis FWA and to pivot about a respective swivel axis SA. The caster assemblies 120 are generally arranged on opposing lateral sides of the front support assembly 110 and are operatively attached to the front struts 116. A lateral brace (not shown) extends laterally between the front struts 116 to, among other things, afford rigidity to the support structure 102. Here, a foot rest 126 is pivotably coupled to each of the front struts 116 adjacent to the caster assemblies 120 (pivoting not shown in detail) to provide support to the patient's feet during transport. For each of the pivotable connections disclosed herein, it will be appreciated that one or more fasteners, bushings, bearings, washers, spacers, and the like may be provided to facilitate smooth pivoting motion between various components.

The representative versions of the patient transport apparatus 100 illustrated throughout the drawings comprise different handles arranged for engagement by caregivers during patient transport. More specifically, the patient transport apparatus 100 comprises front handle assemblies 128, pivoting handle assemblies 130, and an upper handle assembly 132 (hereinafter referred to as "handle assembly 132"), each of which will be described in greater detail below. The front handle assemblies 128 are supported within the respective intermediate arms 118 for movement between a collapsed position 128A (see FIG. 1A) and an extended position 128B (see FIG. 1B). To this end, the front handle assemblies 128 may be slidably supported by bushings, bearings, and the like coupled to the intermediate arms 118. In some versions, the front handle assemblies 128 may be lockable in and/or between the collapsed position 128A and the extended position 128B via respective front handle locks 134 (see FIG. 1A). Here, a caregiver may engage the front handle locks 134 to facilitate moving the front handle assemblies 128 between the collapsed position 128A and the extended position 128B. The front handle assemblies 128 are generally arranged so as to be engaged by a caregiver during patient transport up or down stairs when in the extended position 128B. The front handle assemblies 128 will be described in greater detail below.

The pivoting handle assemblies 130 are coupled to the respective rear uprights 114 of the rear support assembly 108, and are movable relative to the rear uprights 114 between a stowed position and an engagement position. Like the front handle assemblies 128, the pivoting handle assemblies 130 are generally arranged for engagement by a caregiver during patient transport, and may advantageously be utilized in the engagement position when the patient transport apparatus 100 operates in the chair configuration to transport the patient along floor surfaces. In some versions, the pivoting handle assemblies 130 could be configured similar to as is disclosed in U.S. Pat. No. 6,648,343, previously referenced. Other configurations are contemplated.

Figure 3:
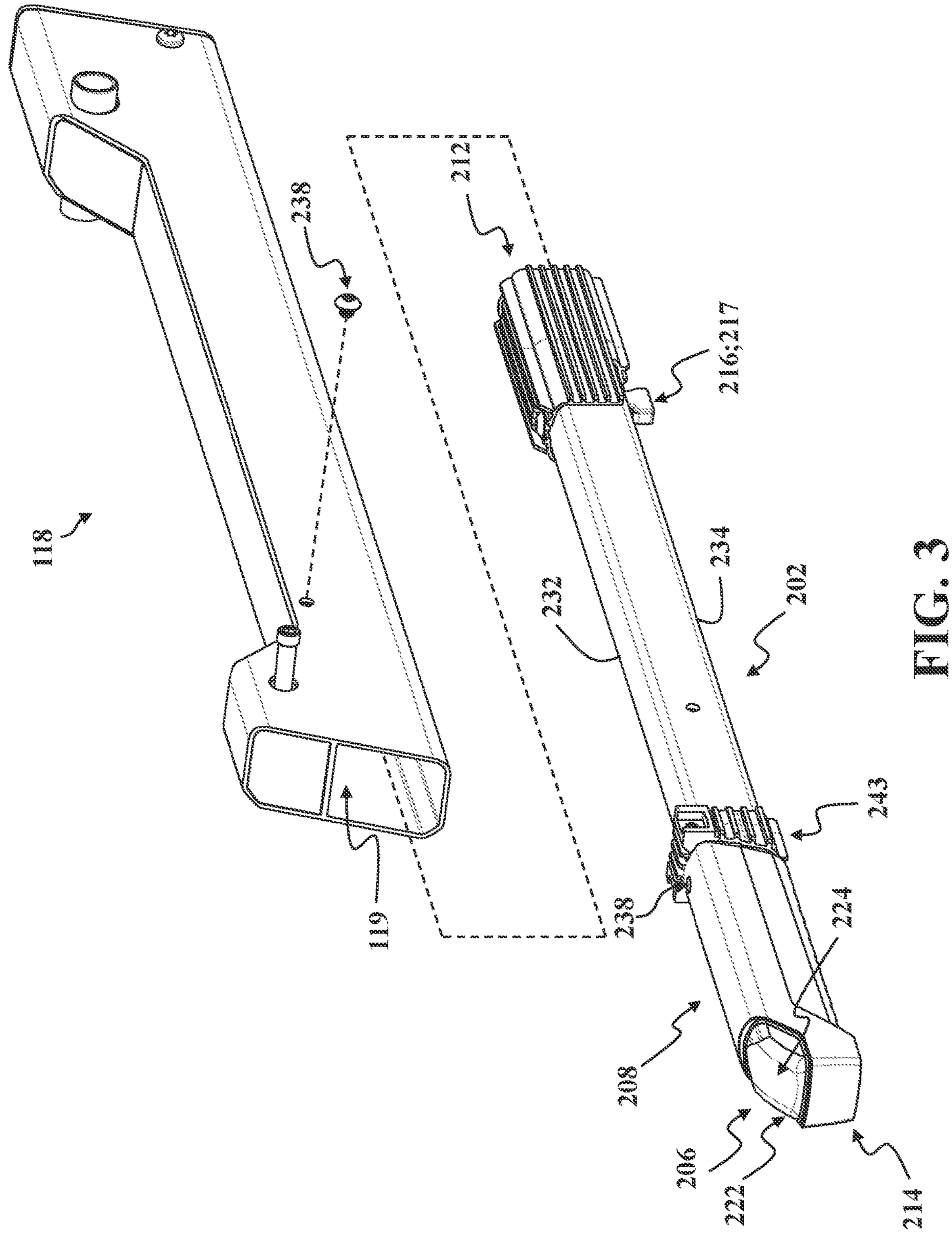
FIG. 3 is a partial schematic view of portions of the patient transport apparatus of FIGS. 1A-1B, showing a perspective view of a respective intermediate arm and the front handle assembly.
Figure 4A:
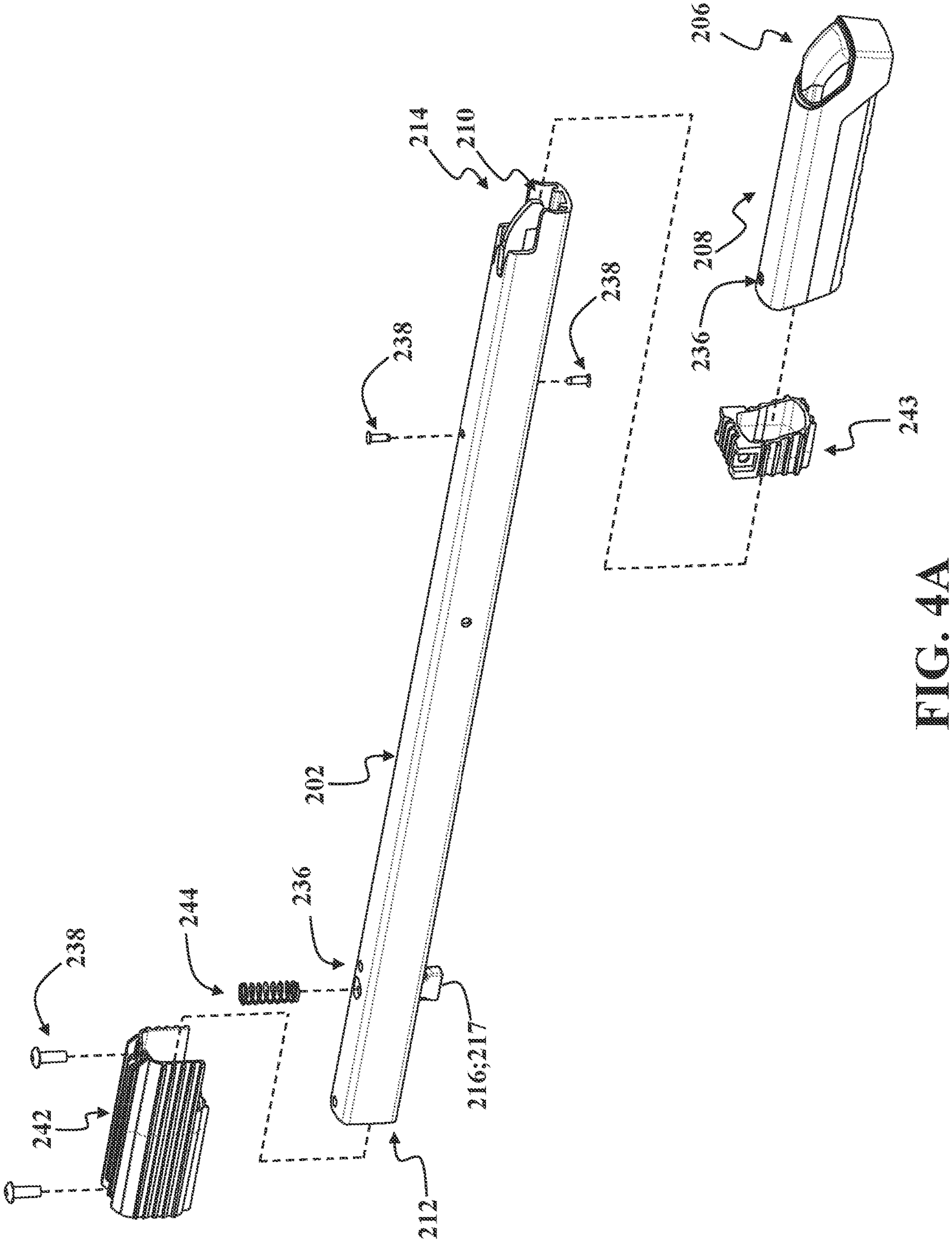
FIG. 4A is a partial schematic view of portions of the patient transport apparatus of FIGS. 1A-1B, showing a side perspective view of the intermediate arm and extension.
Figure 4B:
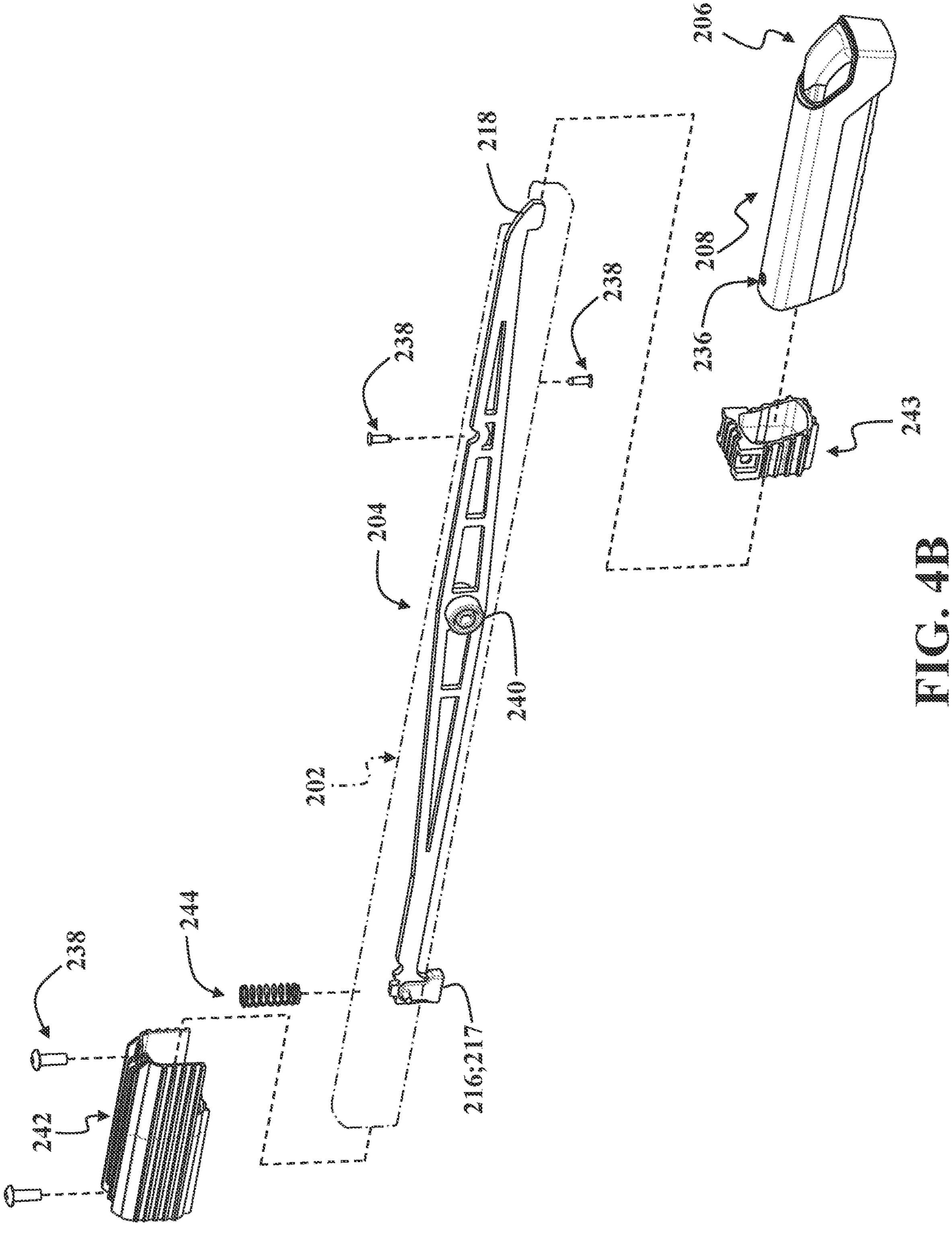
FIG. 4B is a partial schematic view of portions of the patient transport apparatus of FIGS. 1A-1B, showing a side perspective view of the pivot bar and extension.
Figure 5:
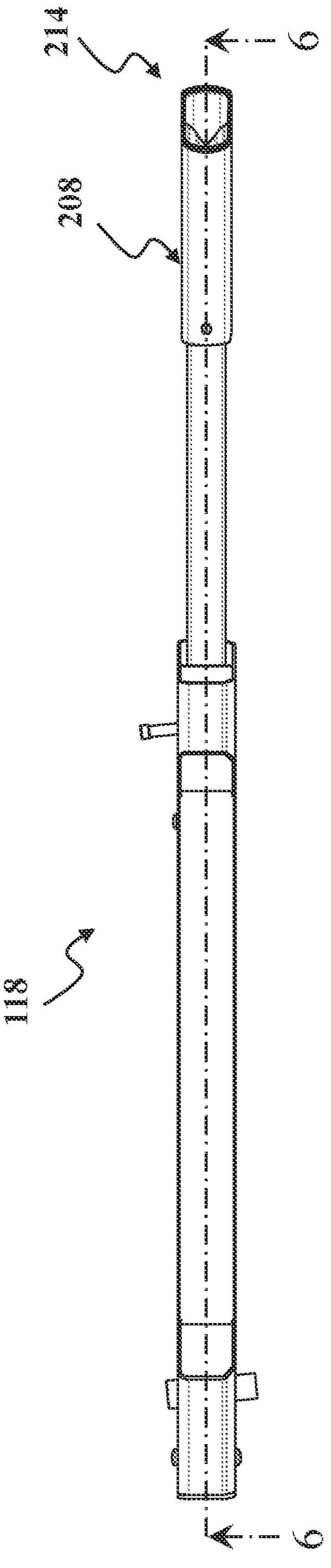
FIG. 5 is a top perspective view of the patient transport apparatus of FIGS. 1A-1B, showing a front perspective view of the intermediate arm and extension.
Figure 6A:
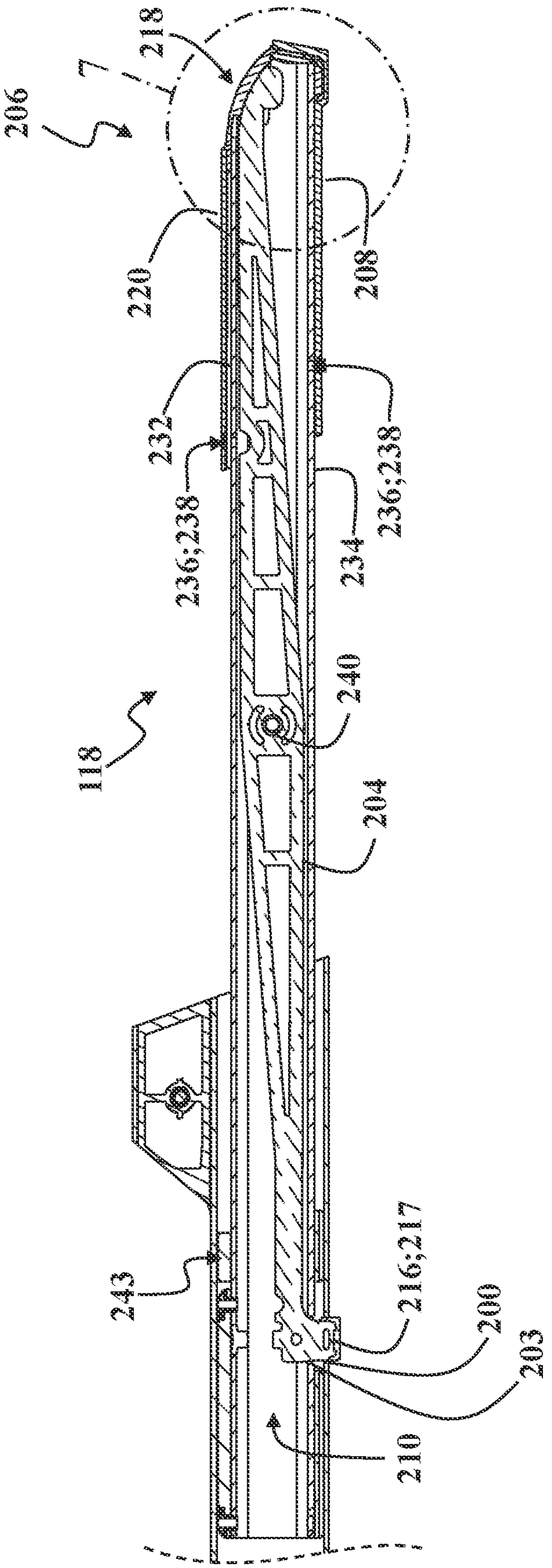
FIG. 6A is a side perspective view of the of the patient transport apparatus of FIGS. 1A-1B, showing the side perspective view of the pivot bar, extension, and selector with the pivot bar in a collapsed position.
Figure 6B:
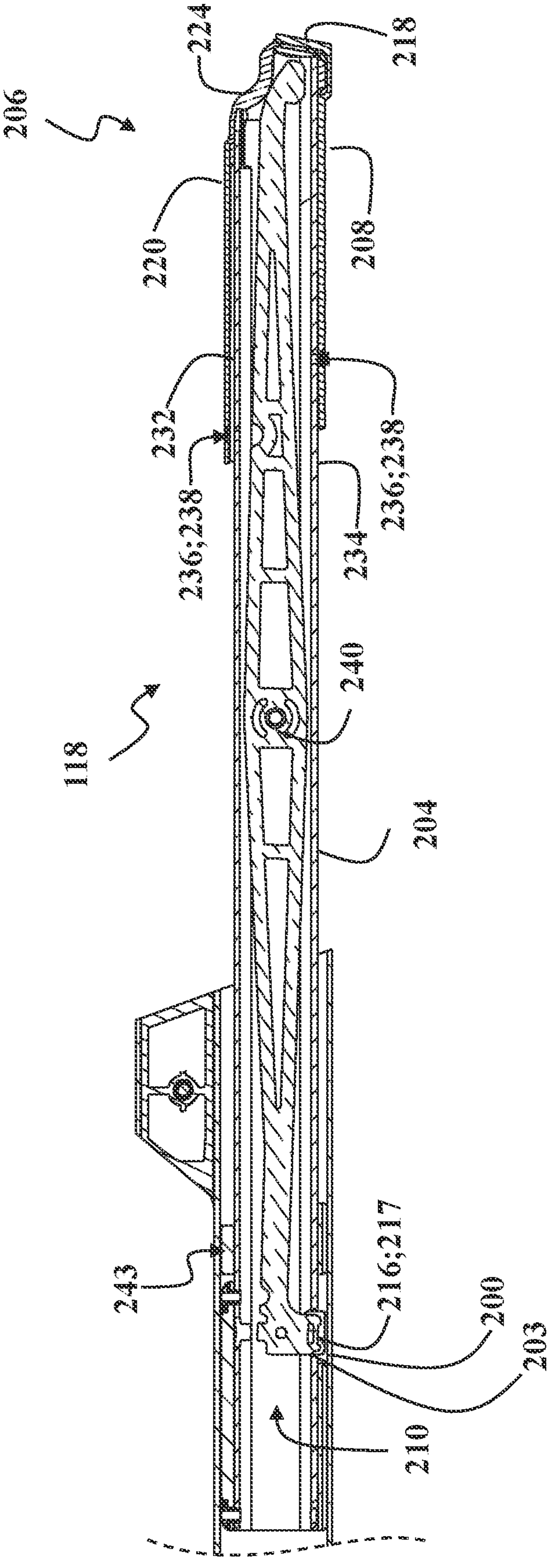
FIG. 6B is a side perspective view of the of the patient transport apparatus of FIGS. 1A-1B, showing the side perspective view of the pivot bar, extension, and selector with the pivot bar in an extended position.
Figure 7:
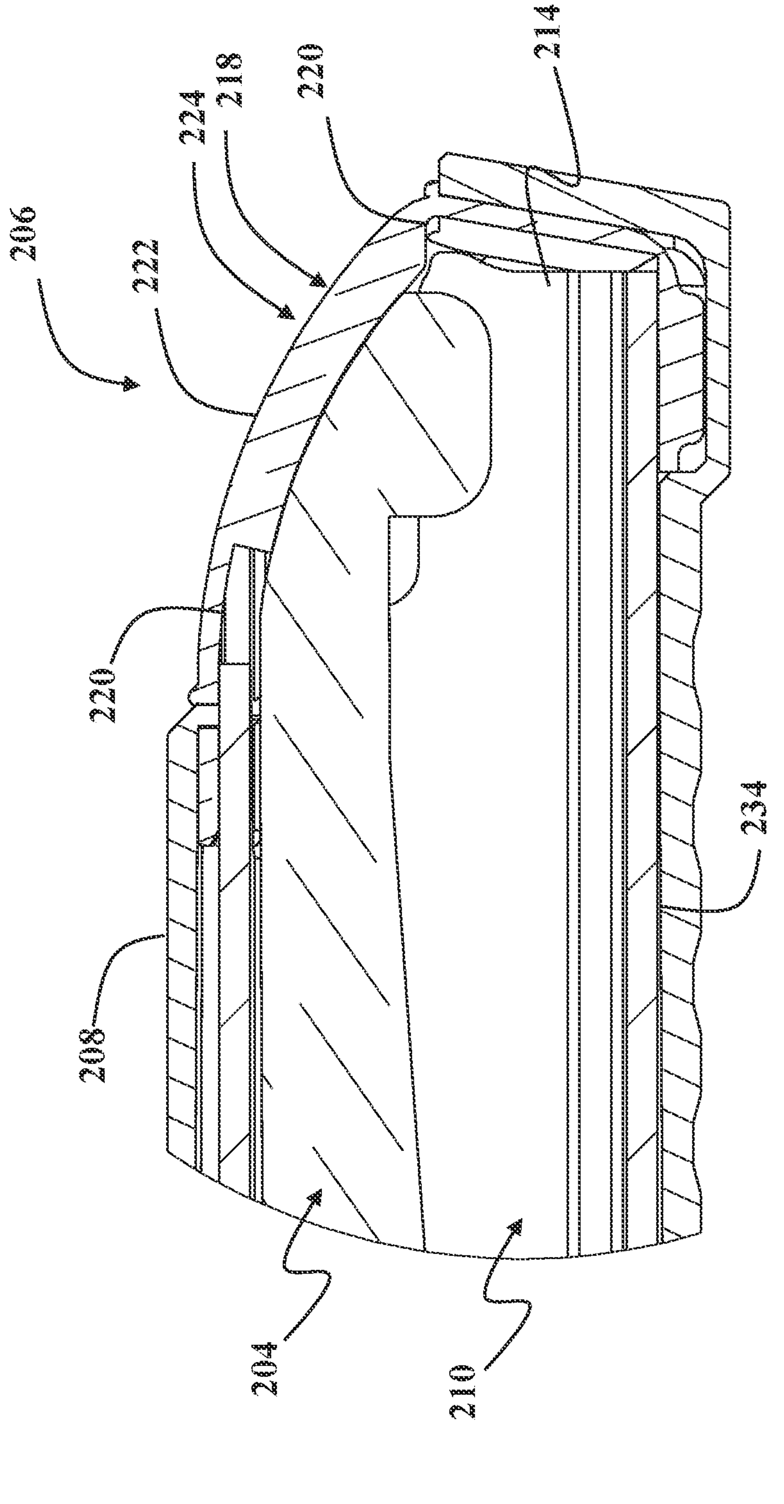
FIG. 7 is a is a perspective view of the of the patient transport apparatus of FIGS. 1A-1B, showing the side perspective view of the extension and selector in a collapsed position.

The handle assembly 132 is also coupled to the rear support assembly 108, and generally comprises an upper grip 136 operatively attached to extension posts 138 which are supported within the respective rear uprights 114 for movement between a collapsed position 132A (see FIG. 1A) and an extended position 132B (see FIG. 1B). To this end, the extension posts 138 of the handle assembly 132 may be slidably supported by bushings, bearings, and the like (not shown) coupled to the rear uprights 114, and may be lockable in and/or between the collapsed position 132A and the extended position 132B via an extension lock mechanism 140 with an extension lock release 142 arranged for engagement by the caregiver. As is best shown in FIG. 3, the extension lock release 142 may be realized as a flexible connector which extends generally laterally between the rear uprights 114, and supports a cable connected to extension lock mechanisms 140 which releasably engage the extension posts 138 to maintain the handle assembly 132 in the extended position 132B and the collapsed position 132A (not shown in detail). Here, it will be appreciated that the extension lock mechanism 140 and/or the extension lock release 142 could be of a number of different styles, types, configurations, and the like sufficient to facilitate selectively locking the handle assembly 132 in the extended position 132B. In some versions, the handle assembly 132, the extension lock mechanism 140, and/or the extension lock release 142 could be configured similar to as is disclosed in U.S. Pat. No. 6,648,343, previously referenced. Other configurations are contemplated.

In some versions, the upper grip 136 generally comprises a first hand grip region 144 arranged adjacent to one of the extension posts 138, and a second hand grip region 146 arranged adjacent to the other of the extension posts 138, each of which may be engaged by the caregiver to support the patient transport apparatus 100 for movement, such as during patient transport up or down stairs.

As noted above, the patient transport apparatus 100 is configured for use in transporting the patient across floor surfaces, such as when operating in the stair configuration, and for transporting the patient along stairs when operating in the stair configuration. To these ends, the illustrated patient transport apparatus 100 includes a carrier assembly 148 arranged for movement relative to the support structure 102 between the chair configuration and the stair configuration. The carrier assembly 148 generally comprises at least one shaft 150 defining a wheel axis WA, one or more rear wheels 152 supported for rotation about the wheel axis WA, at least one track assembly 154 having a belt 156 for engaging stairs, and one or more hubs 158 supporting the shaft 150 and the track assembly 154 and the shaft 150 for concurrent pivoting movement about a hub axis HA. Here, movement of the carrier assembly 148 from the chair configuration to the stair configuration simultaneously deploys the track assembly 154 for engaging stairs ST with the belt 156 and moves the wheel axis WA longitudinally closer to the front support assembly 110 so as to position the rear wheels 152 further underneath the seat section 104 and closer to the front wheels 122.

The movement of the rear wheels 152 relative to the front wheels 122 when transitioning from the chair configuration to the stair configuration that is afforded by the patient transport apparatus 100 of the present disclosure affords significant improvements in patient comfort and caregiver usability, in that the rear wheels 152 are arranged to promote stable transport across floor surfaces in the chair configuration but are arranged to promote easy transitioning from floor surfaces to stairs as the patient transport apparatus 100 is "tilted" backwards about the rear wheels 152. Put differently, positioning the rear wheels 152 relative to the front wheels 122 consistent with the present disclosure makes "tilting" the patient transport apparatus 100 significantly less burdensome for the caregivers and, at the same time, much more comfortable for the patient due to the arrangement of the patient's center of gravity relative to the portion of the rear wheels 152 contacting the floor surface as the patient transport apparatus 100 is "tilted" backwards to transition into engagement with the stairs ST.

In the representative versions illustrated herein, the carrier assembly 148 comprises hubs 158 that are pivotably coupled to the respective rear uprights 114 for concurrent movement about the hub axis HA. Here, one or more bearings, bushings, shafts, fasteners, and the like (not shown in detail) may be provided to facilitate pivoting motion of the hubs 158 relative to the rear uprights 114. Similarly, bearings and/or bushings (not shown) may be provided to facilitate smooth rotation of the rear wheels 152 about the wheel axis WA. Here, the shafts 150 may be fixed to the hubs 158 such that the rear wheels 152 rotate about the shafts 150 (e.g., about bearings supported in the rear wheels 152), or the shafts 150 could be supported for rotation relative to the hubs 158. Each of the rear wheels 152 is also provided with a wheel lock (not shown) coupled to its respective hub 158 to facilitate inhibiting rotation about the wheel axis WA. The wheel locks are generally pivotable relative to the hubs 158, and may be configured in a number of different ways without departing from the scope of the present disclosure. While the representative version of the patient transport apparatus 100 illustrated herein employs hubs 158 with "mirrored" profiles that are coupled to the respective rear uprights 114 and support discrete shafts 150 and wheel locks, it will be appreciated that a single hub 158 and/or a single shaft 150 could be employed. Other configurations are contemplated.

The rear uprights 114 each generally extend between a lower upright end and an upper upright end, with the hub axis HA arranged adjacent to the lower upright end. The lower upright end is supported for movement within the hub

158, which may comprise a hollow profile or recess defined by multiple hub housing components (not shown in detail). The rear uprights 114 may each comprise a generally hollow, extruded profile which supports various components of the patient transport apparatus 100. In the illustrated version, the hub axis HA is arranged generally vertically between the rear arm axis RAA and the wheel axis WA.

The track assemblies 154 move concurrently with the hubs 158 between the chair configuration and the stair configuration. Here, the track assemblies 154 are arranged in a retracted position 154A when the carrier assembly 148 is disposed in the chair configuration and are disposed in a deployed position 154B when the carrier assembly 148 is disposed in the stair configuration. The illustrated patient transport apparatus 100 comprises a deployment linkage 162 and a deployment lock mechanism 164 with a deployment lock release 166 arranged for engagement by the caregiver to facilitate changing between the retracted position 154A and the deployed position 154B.

In the illustrated version, the patient transport apparatus 100 comprises laterally-spaced track assemblies 154 each having a single belt 156 arranged to contact stairs. However, it will be appreciated that other configurations are contemplated, and a single track assembly 154 and/or track assemblies with multiple belts 156 could be employed. The track assemblies 154 each generally comprise a rail 168 extending between a first rail end 168A and a second rail end 168B. The second rail end 168B is operatively attached to the hub 158, such as with one or more fasteners (not shown in detail). An axle defining a roller axis RA is disposed adjacent to the first rail end 168A of each rail 168, and a roller is supported for rotation about the roller axis RA. For each of the track assemblies 154, the belt 156 is disposed in engagement with the roller and is arranged for movement relative to the rail 168 in response to rotation of the roller about the roller axis RA. Adjacent to the second rail end 168B of each rail 168, a drive pulley is supported for rotation about a drive axis DA and is likewise disposed in engagement with the belt 156. Here, the drive pulley comprises outer teeth which are disposed in engagement with inner teeth formed on the belt 156. The track assemblies 154 each also comprise a belt tensioner, configured to adjust tension in the belt 156 between the roller and the drive pulley.

The patient transport apparatus 100 comprises a drive system, generally indicated at 182, configured to facilitate driving the belts 156 of the track assemblies 154 relative to the rails 168 to facilitate movement of the patient transport apparatus 100 up and down stairs. To this end, the drive system 182 comprises a drive frame 184 and a cover 186 which are operatively attached to the hubs 158 of the carrier assembly 148 for concurrent movement with the track assemblies 154 between the retracted position 154A and the deployed position 154B. A motor is coupled to the drive frame 184 and is concealed by the cover 186. The motor is configured to selectively generate rotational torque used to drive the belts 156 via the drive pulleys, as described in greater detail in U.S. Patent Application Publication No. 2021/0196535, previously referenced.

The patient transport apparatus 100 employs the deployment lock mechanism 164 to releasably secure the track assembly 154 in the retracted position 154A and in the deployed position 154B. As is described in greater detail below, the deployment lock release 166 is arranged for engagement by the caregiver to move between the retracted position 154A and the deployed position 154B. The deployment lock mechanism 164 is coupled to the track assemblies 154 for concurrent movement, and the deployment linkage 162 is coupled between the deployment lock mechanism 164 and the support structure 102. The illustrated deployment linkage 162 generally comprises connecting links which are pivotably coupled to the support structure 102, and brace links which are coupled to the deployment lock mechanism 164 and are respectively pivotably coupled to the connecting links.

In various versions, referring to FIGS. 2A-10, the patient transport apparatus 100 operable by a user for transporting a patient along stairs includes the support structure 102, the seat section 104, the track assembly 154, and the front handle assembly 128. The support structure 102 includes a pair of intermediate arms 118 defining respective catches 200.

As noted above, the seat section 104 is for supporting the patient and is pivotably coupled to the support structure 102 about the rear seat axis RSA. The track assembly 154 is arranged for movement relative to the support structure 102 between a chair configuration for traversing floor surfaces and a stair configuration for traversing stairs. The track assembly 154 is coupled to the support structure 102 for movement between a collapsed position and an extended position for engaging stairs.

Referring generally to FIGS. 2A-10, the front handle assemblies 128 are supported within interiors 119 of respective intermediate arms 118 for movement between respective collapsed positions 128A and respective extended positions 128B to facilitate user engagement by caregivers while transporting patient, such as up or down flights of stairs. The front handle assemblies 128 each respectively include an extension 202, a pivot bar 204, a selector 206, and a grip shell 208, and other components, as will be described in greater detail below.

The extension 202 generally defines an inner chamber 210 and has a first end 212 and a second end 214. The extension 202 is slidably supported for movement relative to the intermediate arm 118 via a slider block 242 and a bearing block 243. The slider block 242 is coupled to the first end 212 of the extension 202 via one or more fasteners 238 (e.g., rivets, bolts, and the like), and moves concurrently with the extension 202 as the front handle assembly 128 operates between the collapsed position 128A (see FIGS. 1A and 2A) and the extended position 128B (see FIGS. 1B and 2B). Here, the slider block 242 moves within the interior 119 of the intermediate arm 118. The bearing block 243 is coupled to the intermediate arm 118 via fasteners (not shown in detail) and is similarly positioned within the interior 119, but slidably supports the extension 202 for movement between the collapsed position 128A and the extended position 128B. It will be appreciated that the slider block 242 and/or the bearing block 243 could be of various types, styles, and/or configurations suitable to facilitate sliding, telescopic movement of the front handle assemblies 128.

The extension 202 has a notched profile (not shown in detail) adjacent to the second end 214 to, among other things, facilitate operation of the front handle locks 134 via user engagement with the selector 206 to move the pivot bar 204, as described in greater detail below. The extension 202 also defines at least one catch 200 as noted above. Here, the catch 200 is shaped to engage a portion of the pivot bar 204 to retain the front handle assembly 128 in the extended position 128B (see FIG. 2B). However, it will be appreciated that additional catches 200 may be utilized, arranged such as to retain the front handle assembly 128 in the collapsed position 128A (see FIG. 2A), and/or in one or more intermediate positions (not shown) between the extended position 128B and the collapsed position 128A. Other configurations are contemplated.

The pivot bar 204 is pivotably supported within the inner chamber 210 of the extension 202 to the front handle assembly 128. The pivot bar 204 extends between a latch end 216 defining or otherwise supporting a latch 217 shaped for releasable engagement with one or more catches 200 of one of the intermediate arms 118, and an engagement end 218 (see FIG. 7). Pivoting movement of the pivot bar 204 occurs about an axis (not shown in detail) defined via a bearing arrangement 240 that is coupled to the pivot bar 204 between the latch end 216 and the engagement end 218. The bearing arrangement 240 arranged to be slidably inserted into the inner chamber 210 of the extension 202 during assembly.

The latch 217 is either defined by or operatively attached to the latch end 216 of the pivot bar 204, and is shaped to be removably inserted into one or more of the catches 200 of the intermediate arm 118 to retain the front handle assembly 128 in the extended position 128B, the collapsed position 128A, and/or other intermediate positions as noted above. The engagement end 218 of the pivot bar 204 is shaped and arranged to receive force applied to the selector 206 via the caregiver to release the front handle lock 134, as described in greater detail below. Here, in response to force applied to the engagement end 218, the pivot bar 204 pivots within the extension 202 which, in turn, causes the latch end 216 to come out of engagement with the catch 200.

The front handle assembly 128 further includes a biasing element 244 interposed between the extension 202 and the pivot bar 204. The biasing element 244 is arranged to urge the latch end 216 (or the latch 217 itself) into engagement with the catch 200, such as when the caregiver or another user has disengaged the button 222 with the latch 217 disposed in alignment with one of the catches 200. It will be appreciated that the biasing element 244 could be of various types, styles, and/or configurations suitable to engage the catch 200 and the latch end 216.

In the illustrated versions, the extension 202 also defines a keeper aperture 203 (see FIGS. 6A-6B) shaped and arranged to receive at least a portion of the latch end 216 of the pivot bar 204 to, among other things, allow the latch end 216 to move into engagement with the one or more catches 200. The keeper aperture 203 also helps facilitate longitudinal alignment and/or retention of the pivot bar 204 relative to the extension 202.

Figure 2A:
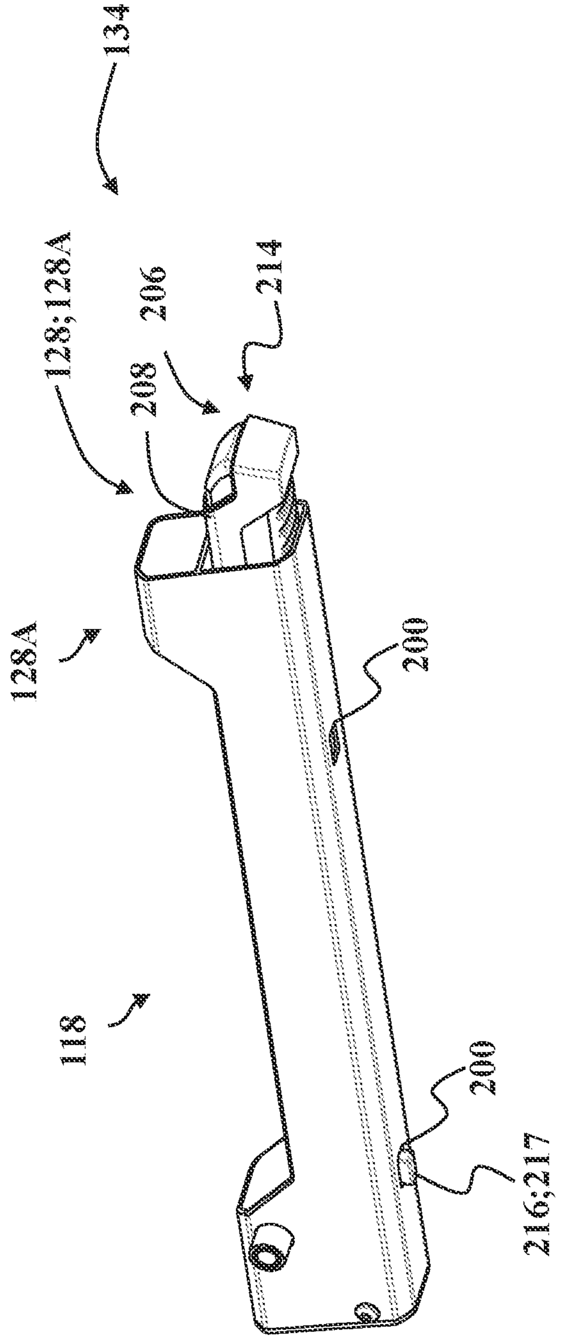
FIG. 2A is a perspective view of the patient transport apparatus of FIGS. 1A-1B, shown with the front handle assembly disposed in a collapsed position.
Figure 2B:
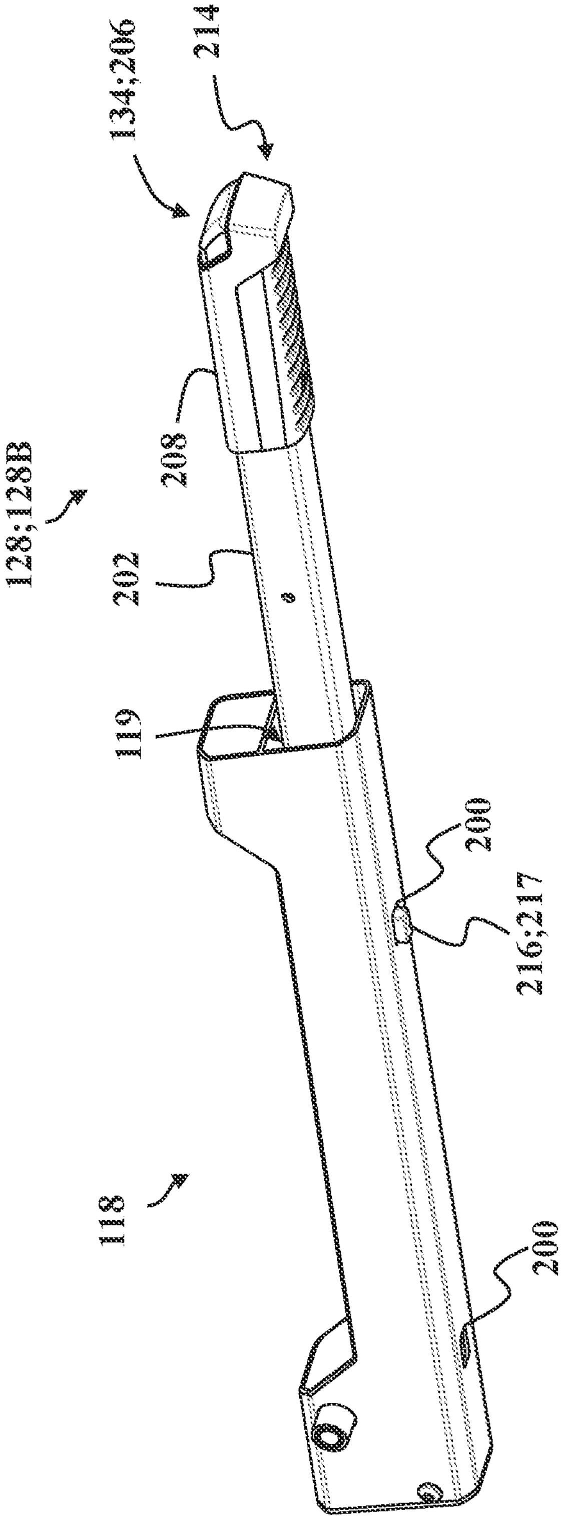
FIG. 2B is another front perspective view of the patient transport apparatus of FIGS. 1A-1B, shown with the front handle assembly disposed in an extended position.

The selector 206 generally defines a brace body 220, a button 222 movably supported by the brace body 220, and an interface 224 arranged to contact the engagement end 218 of the pivot bar 204 in response to engagement with the button 222 via the caregiver such that pivoting movement of the pivot bar 204 disengages the latch end 216 from the catch 200 as noted above. The selector 206 is formed as a unitary, one-piece component in the illustrated versions. However, other configurations are contemplated. As shown in FIG. 2A, the front handle assembly 128 is depicted in a collapsed position 128A. Furthermore, as shown in FIG. 2B, the front handle assembly 128 is depicted in the extended position 128B. As the interface 224 of the button 222 of the front handle lock 134 is engaged by the caregiver, the engagement end 218 of the pivot bar 204 is pressed which, in turn, pivots the pivot bar 204 and compresses the biasing element 244 while releasing the catch 200 from the latch end 216 in order to enable the caregiver to move the front handle assembly 128 from the collapsed position 128A to the extended position 128B.

Figure 8:
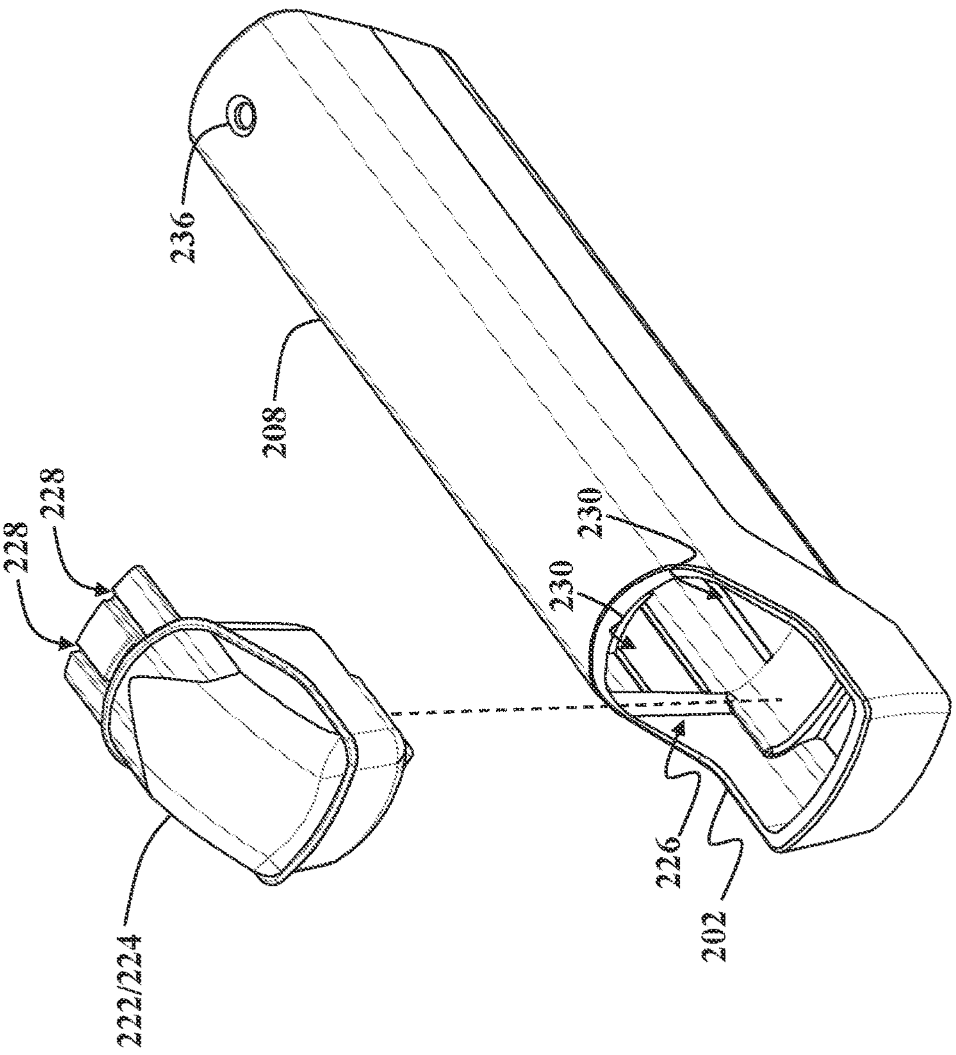
FIG. 8 is a top perspective view of the of the patient transport apparatus of FIGS. 1A-1B, showing the top perspective view of the extension and selector.
Figure 9:
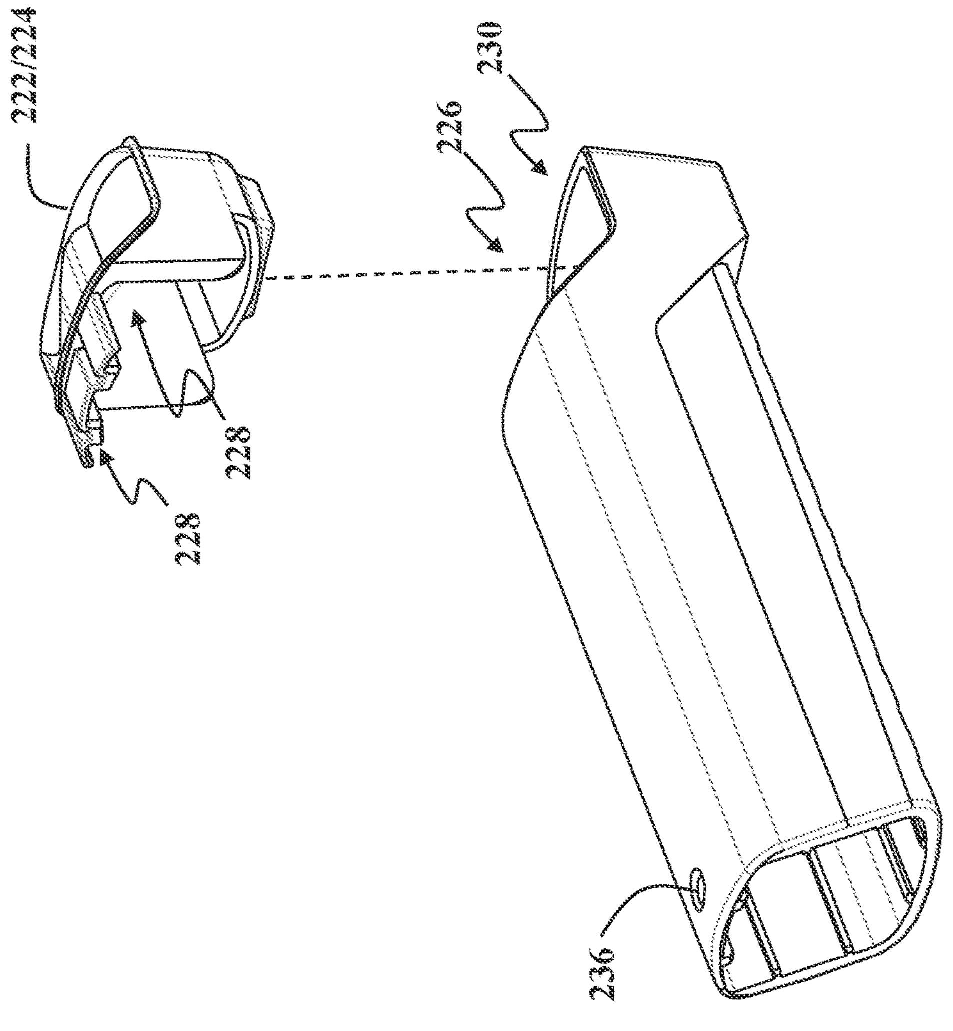
FIG. 9 is a back side perspective view of the of the patient transport apparatus of FIGS. 1A-1B, showing the back side perspective view of the extension and selector.
Figure 10:
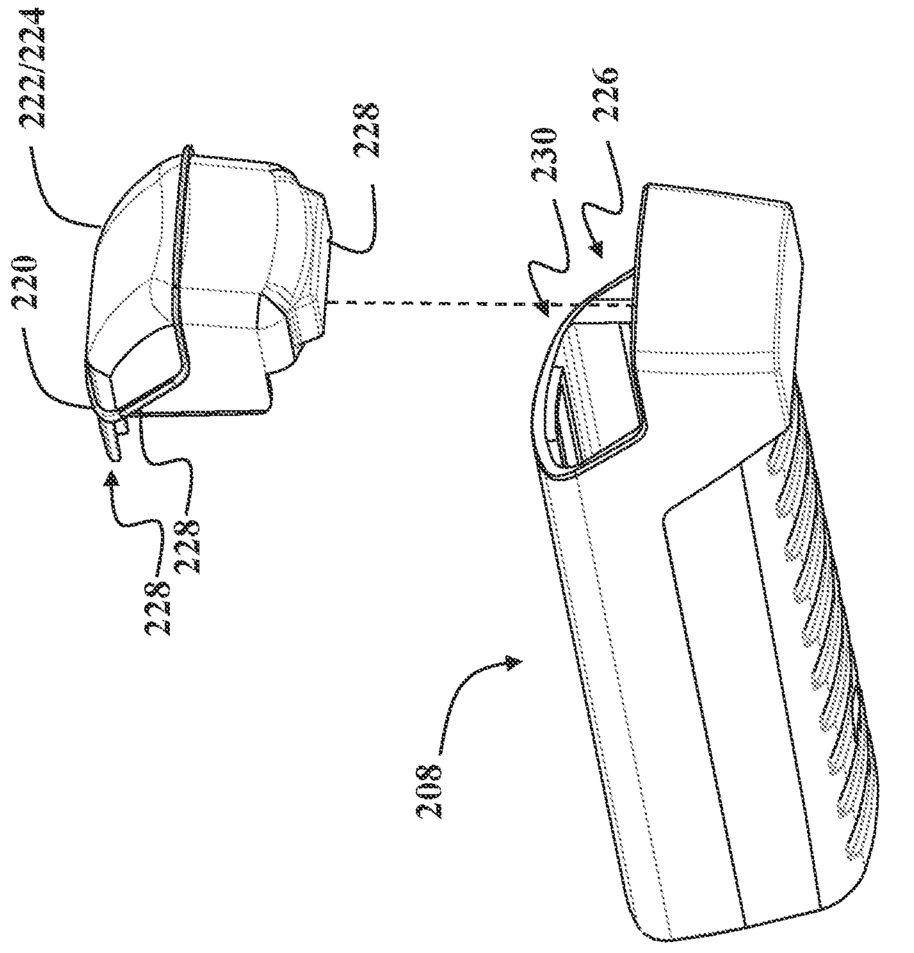
FIG. 10 is a side perspective view of the of the patient transport apparatus of FIGS. 1A-1B, showing the side perspective view of the extension and selector.

As shown in FIGS. 8-10, the button 222 includes a plurality of slots 228 to engage the grip shell 208. The plurality of slots 228 of the button 222 are configured to engage the grip shell 208 via one or more receiving features 230 to define a tortious path between the inner chamber 210 of the extension 202 and the outside environment. It will be appreciated that the receiving features 230 and/or the slots 228 could define respective ridges, edges, lips, and the like arranged to form or otherwise define the tortious path. It will be appreciated that this configuration helps facilitate preventing the ingress of contaminants towards the inner chamber 210, as well as other components of the front handle assemblies 128.

The grip shell 208 is disposed over the second end 214 of the extension 202, and defines a window 226 shaped to receive the button 222 of the selector 206. The grip shell 208 is operatively coupled to the extension 202 to retain the selector 206 (and, in some versions, the pivot bar 204) relative to the extension 202. Here, the extension 202 has or otherwise defines a top 232 and a bottom 234, and the grip shell 208 is operatively attached to one or both of the top 232 and the bottom 234 (or to other locations of the extension 202) via one or more fastener mounts 236 where respective fasteners 238 (e.g., rivets, bolts, screws, and the like) extend through the fastener mount 236 of the grip shell 208 to secure the grip shell 208 to the extension 202 adjacent to the second end 214. The fastener 238 could be of various types, styles, and/or configurations suitable to engage the extension 202. It will be appreciated that this configuration also helps facilitate retention of the selector 206 relative to the extension 202.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

CLAUSES

I. A patient transport apparatus operable by a user for transporting a patient along stairs, the patient transport apparatus comprising:

a support structure including an intermediate arm defining a catch;

a seat section for supporting the patient, the seat section being pivotably coupled to the support structure about a rear seat axis;

a track assembly arranged for movement relative to the support structure between a chair configuration for traversing floor surfaces and a stair configuration for traversing stairs, the track assembly coupled to the support structure for movement between a stowed position and a deployed position for engaging stairs; and a front handle assembly supported within the intermediate arm for movement between: a collapsed position, and an extended position for assisting the track assembly in transporting patients along stairs, the front handle assembly including:

- an extension defining an inner chamber and having a first end and a second end, the first end disposed in sliding engagement with the intermediate arm of the support structure;
- a pivot bar pivotably supported within the inner chamber of the extension to the front handle about a pivot axis, the pivot bar extending between a latch end shaped for releasable engagement with the catch of the intermediate arm, and an engagement end;
- a selector defining a brace body, a button movably supported by the brace body, and an interface arranged to contact the engagement end of the pivot bar in response to user engagement with the button to disengage the latch end from the catch in response to pivoting movement of the pivot bar; and
- a grip shell disposed over the second end of the extension and defining a window shaped to receive the button of the selector and to prevent ingress of contaminants into the inner chamber of the extension, the grip shell being operatively coupled to the extension to retain the selector and the pivot bar relative to the extension.

II. The patient transport apparatus of clause I, wherein the button includes a plurality of slots each arranged to engage the grip shell.

III. The patient transport apparatus of clause II, wherein the grip shell defines at least one receiving feature; and wherein at least one of the plurality of slots of the button are configured to engage the grip shell via the at least one receiving feature.

IV. The patient transport apparatus of clause III, wherein engagement between the at least one receiving feature and at least one of the plurality of slots of the button defines a tortious path between the inner chamber of the extension and the outside environment.

V. The patient transport apparatus of any of clauses I-IV, wherein the grip shell defines a fastener mount.

VI. The patient transport apparatus of clause V, further including at least one fastener extending through the fastener mount of the grip shell.

VII. The patient transport apparatus of clause VI, wherein the fastener engages the extension between the first and second end.

VIII. The patient transport apparatus of any of clauses I-VII, further including a bearing arrangement disposed within the inner chamber of the extension, the bearing arrangement supporting the pivot bar for movement about an axis.

IX. The patient transport apparatus of any of clauses I-VIII, wherein the front handle assembly further includes a slider block coupled to the first end of the extension and disposed within the inner chamber of the intermediate arm.

X. The patient transport apparatus of any of clauses I-IX, wherein the front handle assembly further includes a biasing element interposed between the extension and the pivot bar, the biasing element arranged to urge the catch into engagement with the latch end.

XI. A patient transport apparatus operable by a user for transporting a patient along stairs, the patient transport apparatus comprising:

- a support structure including a pair of intermediate arms defining respective catches;
- a seat section for supporting the patient, the seat section being pivotably coupled to the support structure about a rear seat axis;
- a track assembly arranged for movement relative to the support structure between a chair configuration for traversing floor surfaces and a stair configuration for traversing stairs, the track assembly coupled to the support structure for movement between a stowed position and a deployed position for engaging stairs; and
- a pair of front handle assemblies each supported within a respective one of the intermediate arms for independent movement between: a collapsed position, and an extended position for assisting the track assembly in transporting patients along stairs, each front handle assembly including:
    - an extension defining an inner chamber and having a first end and a second end, the first end disposed in sliding engagement with the respective intermediate arm of the support structure;
    - a pivot bar pivotably supported within the inner chamber of the extension to the front handle about a pivot axis, the pivot bar extending between a latch end shaped for releasable engagement with the catch of the respective intermediate arm, and an engagement end;
    - a selector defining a brace body, a button movably supported by the brace body, and an interface arranged to contact the engagement end of the pivot bar in response to user engagement with the button to disengage the latch end from the catch in response to pivoting movement of the pivot bar; and
    - a grip shell disposed over the second end of the extension and defining a window shaped to receive the button of the selector and to prevent ingress of contaminants into the inner chamber of the extension, the grip shell being operatively coupled to the extension to retain the selector and the pivot bar relative to the extension.

XII. The patient transport apparatus of clause XI, wherein the button includes a plurality of slots each arranged to engage the grip shell.

XIII. The patient transport apparatus of clause XII, wherein the grip shell defines at least one receiving feature; and

- wherein at least one of the plurality of slots of the button are configured to engage the grip shell via the at least one receiving feature.

XIV. The patient transport apparatus of clause XIII, wherein engagement between the at least one receiving feature and at least one of the plurality of slots of the button defines a tortious path between the inner chamber of the extension and the outside environment.

XV. The patient transport apparatus of any of clauses XI-XIV, wherein the grip shell defines a fastener mount.

XVI. The patient transport apparatus of clause XV, further including at least one fastener extending through the fastener mount of the grip shell.

XVII. The patient transport apparatus of clause XVI, wherein the fastener engages the extension between the first and second end.

XVIII. The patient transport apparatus of any of clauses XI-XVII, further including a bearing arrangement disposed within the inner chamber of the extension, the bearing arrangement supporting the pivot bar for movement about an axis.

XIX. The patient transport apparatus of any of clauses XI-XVIII, wherein the front handle assembly further includes a slider block coupled to the first end of the extension and disposed within the inner chamber of the intermediate arm.

XX. The patient transport apparatus of any of clauses XI-XIX, wherein the front handle assembly further includes a biasing element interposed between the extension and the pivot bar, the biasing element arranged to urge the catch into engagement with the latch end.

What is claimed is:

1. A patient transport apparatus operable by a user for transporting a patient along stairs, the patient transport apparatus comprising:

a support structure including an intermediate arm defining a catch;

a seat section for supporting the patient, the seat section being pivotably coupled to the support structure about a rear seat axis;

a track assembly arranged for movement relative to the support structure between a chair configuration for traversing floor surfaces and a stair configuration for traversing stairs, the track assembly coupled to the support structure for movement between a stowed position and a deployed position for engaging stairs; and a front handle assembly supported within the intermediate arm for movement between: a collapsed position, and an extended position for assisting the track assembly in transporting patients along stairs, the front handle assembly including:

an extension defining an inner chamber and having a first end and a second end, the first end disposed in sliding engagement with the intermediate arm of the support structure;

a pivot bar pivotably supported within the inner chamber of the extension to the front handle about a pivot axis, the pivot bar extending between a latch end shaped for releasable engagement with the catch of the intermediate arm, and an engagement end;

a selector defining a brace body, a button movably supported by the brace body, and an interface arranged to contact the engagement end of the pivot bar in response to user engagement with the button to disengage the latch end from the catch in response to pivoting movement of the pivot bar; and a grip shell disposed over the second end of the extension and defining a window arranged along a top front corner of the front handle assembly and being shaped to receive the button of the selector and to prevent ingress of contaminants into the inner chamber of the extension as the button moves vertically and longitudinally relative to the brace body in response to user engagement with the button, the grip shell being operatively coupled to the extension to retain the selector and the pivot bar relative to the extension.

2. The patient transport apparatus of claim 1, wherein the button includes a plurality of slots each arranged to engage the grip shell.

3. The patient transport apparatus of claim 2, wherein the grip shell defines at least one receiving feature; and wherein at least one of the plurality of slots of the button are configured to engage the grip shell via the at least one receiving feature.

4. The patient transport apparatus of claim 3, wherein engagement between the at least one receiving feature and at least one of the plurality of slots of the button defines a tortious path between the inner chamber of the extension and the outside environment.

5. The patient transport apparatus of claim 1, wherein the grip shell defines a fastener mount.

6. The patient transport apparatus of claim 5, further including at least one fastener extending through the fastener mount of the grip shell.

7. The patient transport apparatus of claim 6, wherein the fastener engages the extension between the first and second end.

8. The patient transport apparatus of claim 1, further including a bearing arrangement disposed within the inner chamber of the extension, the bearing arrangement supporting the pivot bar for movement about an axis.

9. The patient transport apparatus of claim 1, wherein the front handle assembly further includes a slider block coupled to the first end of the extension and disposed within the inner chamber of the intermediate arm.

10. The patient transport apparatus of claim 1, wherein the front handle assembly further includes a biasing element interposed between the extension and the pivot bar, the biasing element arranged to urge the catch into engagement with the latch end.

11. A patient transport apparatus operable by a user for transporting a patient along stairs, the patient transport apparatus comprising:

a support structure including a pair of intermediate arms defining respective catches;

a seat section for supporting the patient, the seat section being pivotably coupled to the support structure about a rear seat axis;

a track assembly arranged for movement relative to the support structure between a chair configuration for traversing floor surfaces and a stair configuration for traversing stairs, the track assembly coupled to the support structure for movement between a stowed position and a deployed position for engaging stairs; and a pair of front handle assemblies each supported within a respective one of the intermediate arms for independent movement between: a collapsed position, and an extended position for assisting the track assembly in transporting patients along stairs, each front handle assembly including:

an extension defining an inner chamber and having a first end and a second end, the first end disposed in sliding engagement with the respective intermediate arm of the support structure;

a pivot bar pivotably supported within the inner chamber of the extension to the front handle about a pivot axis, the pivot bar extending between a latch end shaped for releasable engagement with the catch of the respective intermediate arm, and an engagement end;

a selector defining a brace body, a button movably supported by the brace body, and an interface arranged to contact the engagement end of the pivot bar in response to user engagement with the button to disengage the latch end from the catch in response to pivoting movement of the pivot bar; and a grip shell disposed over the second end of the extension and defining a window arranged along a top front corner of the front handle assembly and being shaped to receive the button of the selector and to prevent ingress of contaminants into the inner chamber of the extension as the button moves vertically and longitudinally relative to the brace body in response to user engagement with the button, the grip shell being operatively coupled to the extension to retain the selector and the pivot bar relative to the extension.

12. The patient transport apparatus of claim 11, wherein the button includes a plurality of slots each arranged to engage the grip shell.

13. The patient transport apparatus of claim 12, wherein the grip shell defines at least one receiving feature; and wherein at least one of the plurality of slots of the button are configured to engage the grip shell via the at least one receiving feature.

14. The patient transport apparatus of claim 13, wherein engagement between the at least one receiving feature and at least one of the plurality of slots of the button defines a tortious path between the inner chamber of the extension and the outside environment.

15. The patient transport apparatus of claim 11, wherein the grip shell defines a fastener mount.

16. The patient transport apparatus of claim 15, further including at least one fastener extending through the fastener mount of the grip shell.

17. The patient transport apparatus of claim 16, wherein the fastener engages the extension between the first and second end.

18. The patient transport apparatus of claim 11, further including a bearing arrangement disposed within the inner chamber of the extension, the bearing arrangement supporting the pivot bar for movement about an axis.

19. The patient transport apparatus of claim 11, wherein the front handle assembly further includes a slider block coupled to the first end of the extension and disposed within the inner chamber of the intermediate arm.

20. The patient transport apparatus of claim 11, wherein the front handle assembly further includes a biasing element interposed between the extension and the pivot bar, the biasing element arranged to urge the catch into engagement with the latch end.

* * * * *